United States Patent
Matsumoto

(10) Patent No.: US 6,751,086 B2
(45) Date of Patent: Jun. 15, 2004

(54) STRUCTURE OF SURFACE-MOUNTING SOLID ELECTROLYTIC CAPACITOR AND METHOD OF MAKING THE SAME

(76) Inventor: Ikuo Matsumoto, x/o Rohm co., Ltd. 21, Saiin Mizosaki-cho, Ukyo-ku, Kyoto-shi Kyoto (JP)

( * ) Notice: Subject to any disclaimer, the term of this patent is extended or adjusted under 35 U.S.C. 154(b) by 0 days.

(21) Appl. No.: 10/233,173

(22) Filed: Aug. 29, 2002

(65) Prior Publication Data

US 2003/0151884 A1 Aug. 14, 2003

(Under 37 CFR 1.47)

(30) Foreign Application Priority Data

Aug. 30, 2001 (JP) ........................ 2001-261355

(51) Int. Cl.⁷ ................................. H01G 9/04
(52) U.S. Cl. ................. 361/523; 361/528; 361/532; 361/541; 361/508
(58) Field of Search ............... 361/523, 528, 361/529, 531, 532, 540, 541; 29/25.03

(56) References Cited

U.S. PATENT DOCUMENTS

| | | | |
|---|---|---|---|
| 5,179,507 A | * 1/1993 | Iijima | 361/534 |
| 5,446,623 A | 8/1995 | Kanetake | |
| 5,626,830 A | * 5/1997 | Sikorska et al. | 424/1.49 |
| 5,629,830 A | * 5/1997 | Yamagami et al. | 361/535 |
| 5,693,104 A | 12/1997 | Kuriyama | |
| 5,850,332 A | * 12/1998 | Kunieda et al. | 361/523 |
| 6,188,566 B1 | * 2/2001 | Aoyama | 361/534 |
| 6,625,009 B2 | * 9/2003 | Maeda | 361/528 |

* cited by examiner

Primary Examiner—Anthony Dinkins
(74) Attorney, Agent, or Firm—Merchant & Gould P.C.

(57) ABSTRACT

A solid electrolytic capacitor includes a package 4 for entirely sealing a capacitor element 1, an anode lead terminal 2 connected to an anode wire 1a of the capacitor element 1, and a cathode lead terminal 3 kept in close contact with a side surface of the capacitor element, wherein both leads are exposed at the bottom surface of the package. The anode lead terminal is formed with an upwardly bent piece 2a provided with a positioning groove 2b. The anode wire of the capacitor element is fitted in the positioning groove, so that the upwardly bent piece completely bridges the gap between the anode wire and the anode lead terminal while accurately positioning the capacitor element at the center widthwise of the anode lead terminal and the cathode lead terminal.

7 Claims, 6 Drawing Sheets

[Fig. 1]
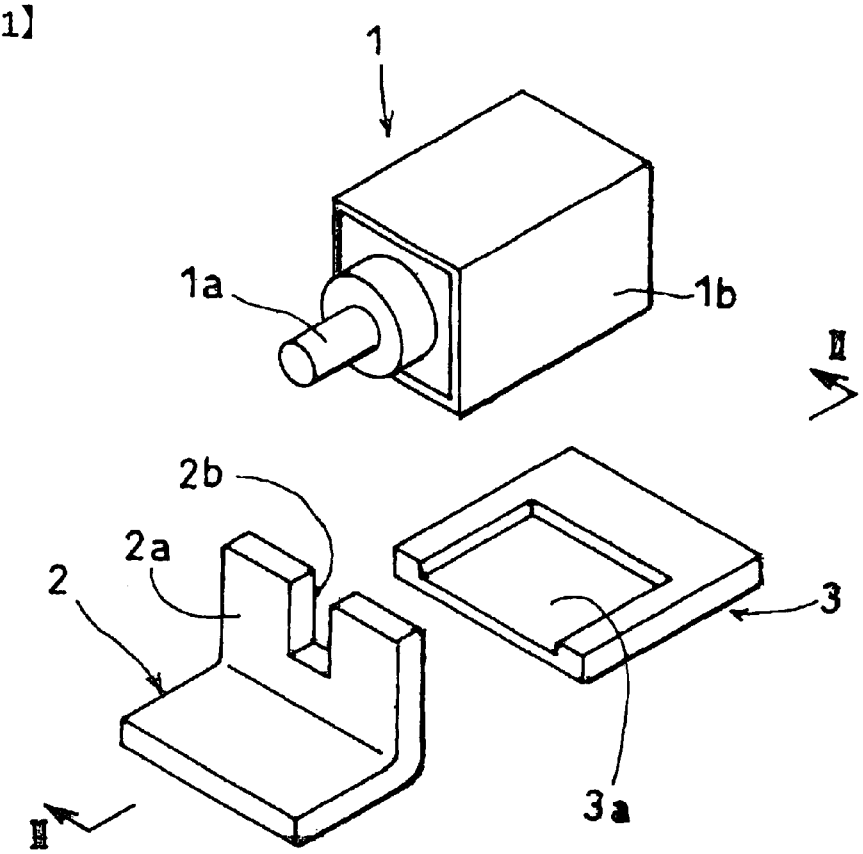
[Fig. 2]
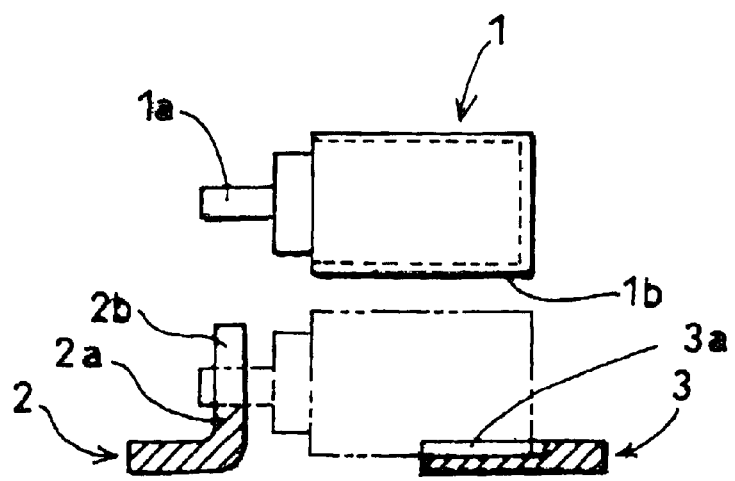

[Fig. 3]
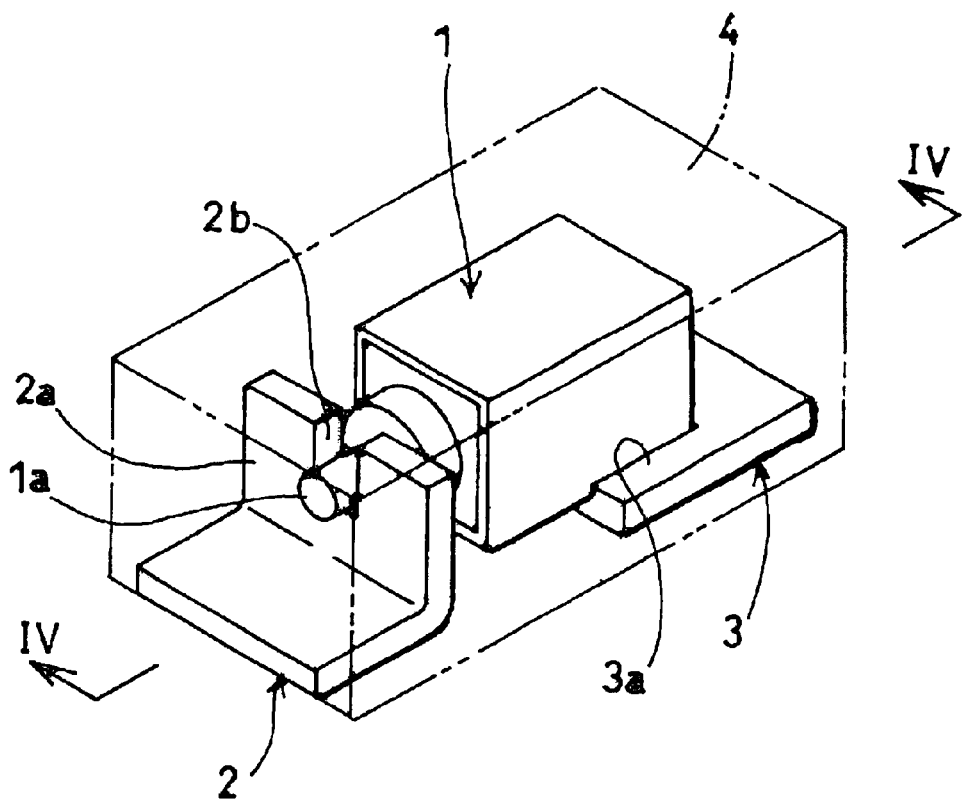
[Fig. 4]
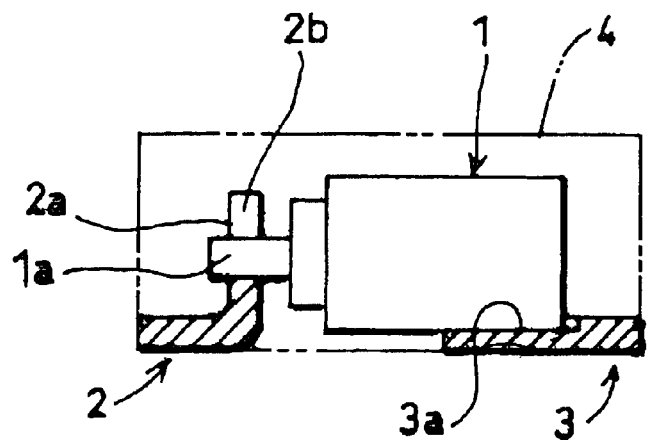

[Fig. 5]
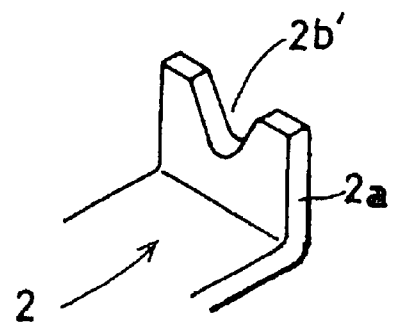
[Fig. 6]
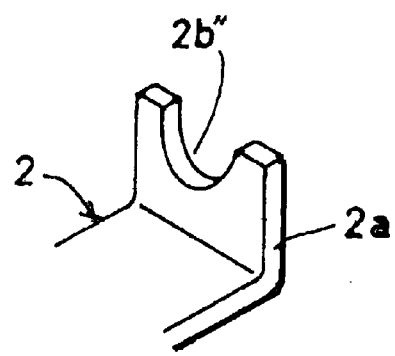
[Fig. 7]
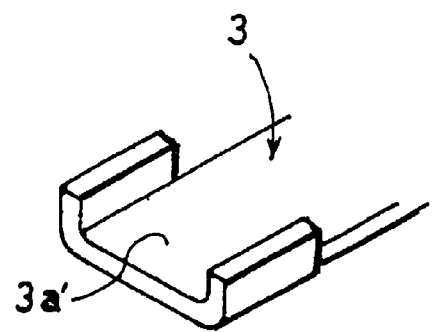

[Fig. 8]
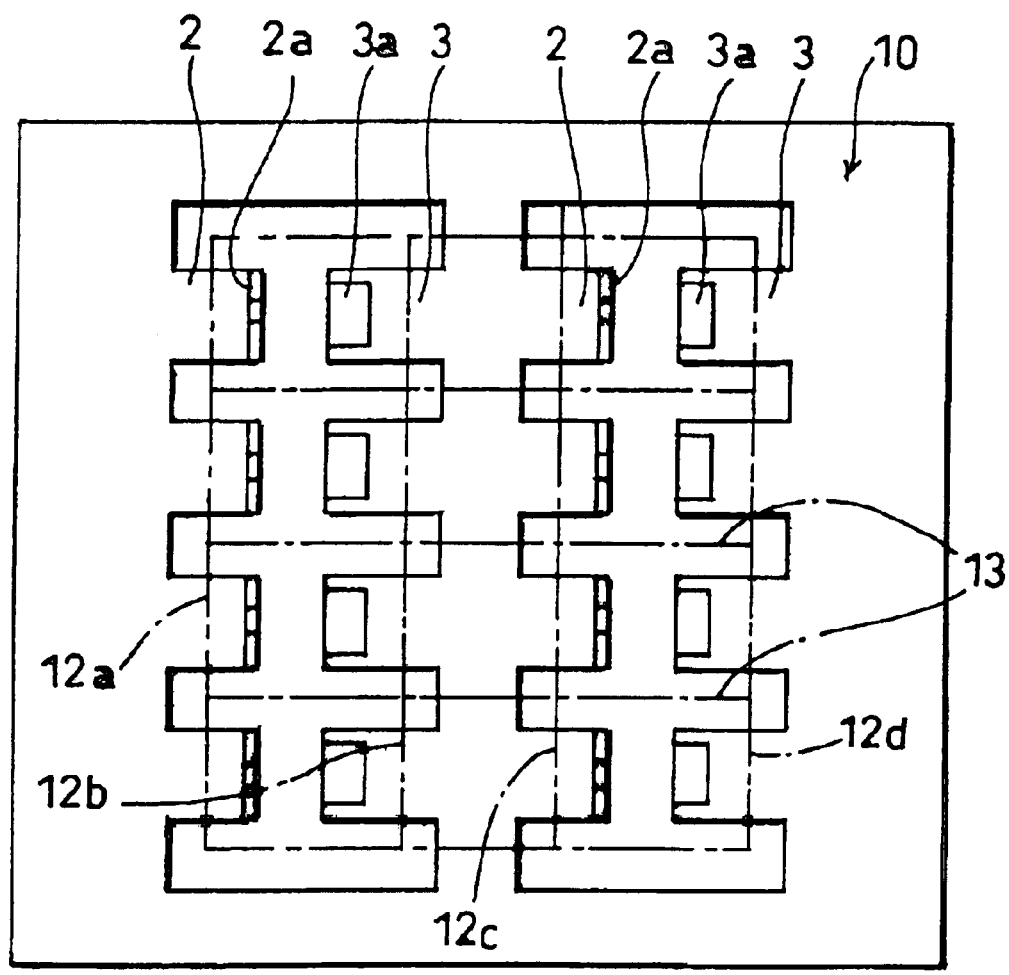

[Fig. 9]
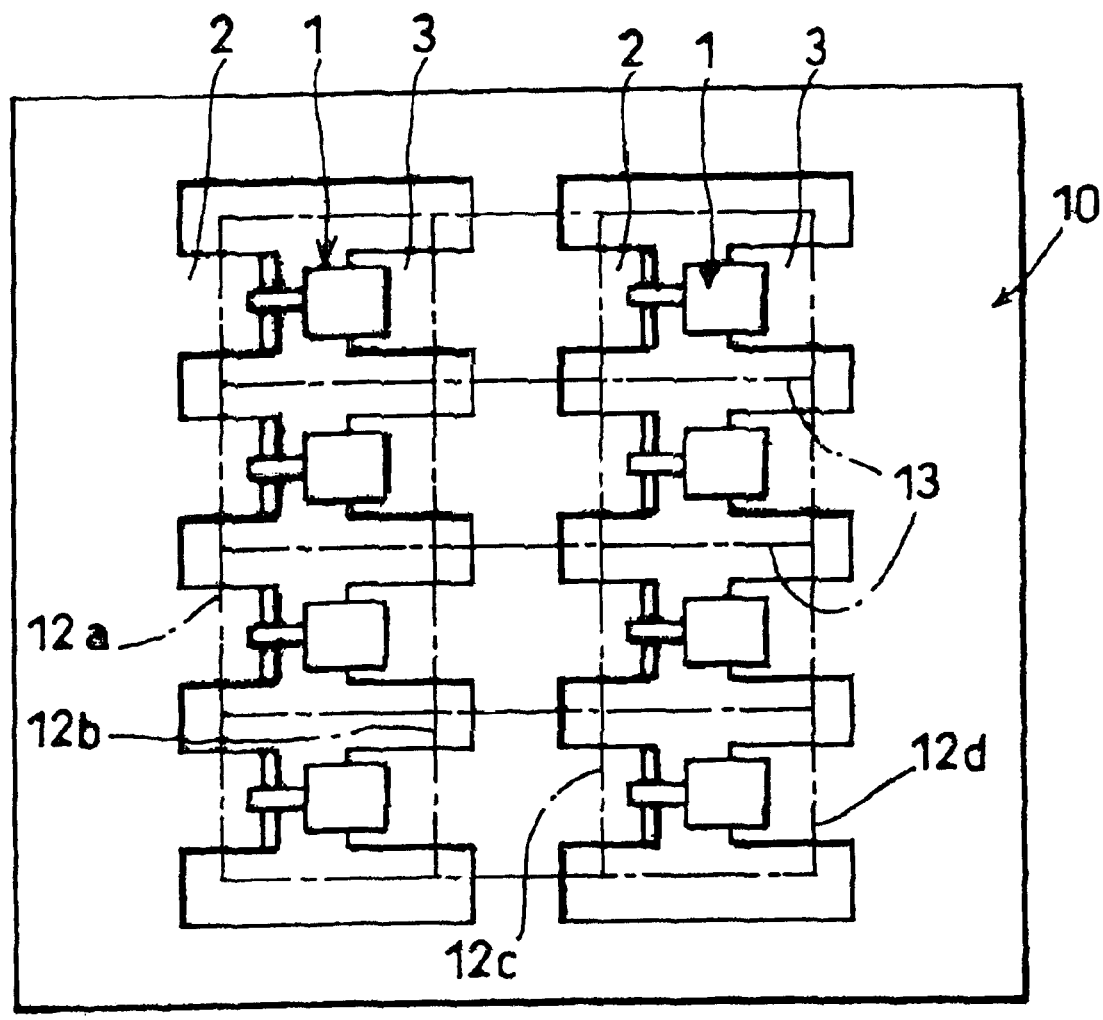

[Fig. 10]
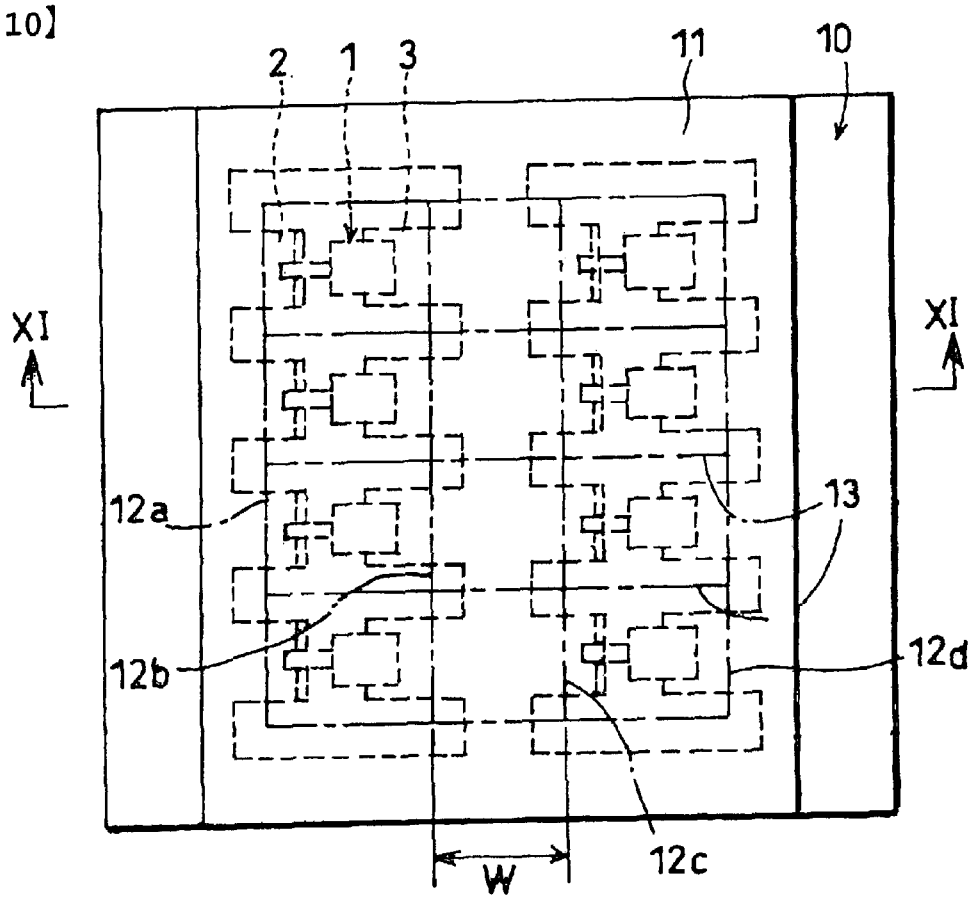
[Fig. 11]
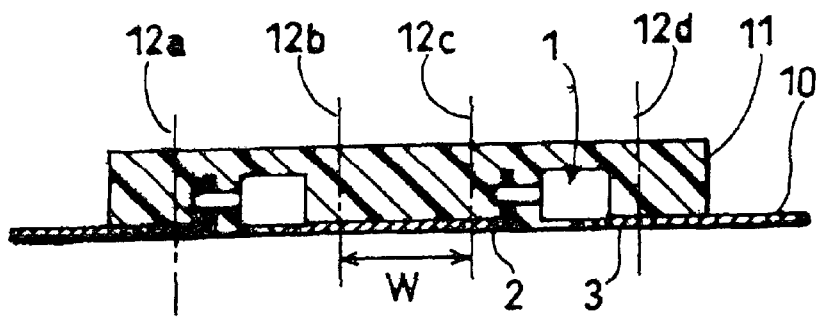

STRUCTURE OF SURFACE-MOUNTING SOLID ELECTROLYTIC CAPACITOR AND METHOD OF MAKING THE SAME

BACKGROUND OF THE INVENTION

1. Field of the Invention

The present invention relates generally to a solid electrolytic capacitor including a capacitor element packaged with synthetic resin. It more particularly relates to a structure of a surface-mounting solid electrolytic capacitor of the type which is mounted on a printed circuit board or the like by soldering, and to a method of making the same.

2. Description of the Related Art

Generally, a surface-mounting solid electrolytic capacitor of the above-described type comprises a capacitor element sealed in a synthetic resin package, an anode lead terminal for electrical connection with an anode wire of the capacitor element, and a cathode lead terminal for electrical connection with a cathode film of the capacitor element, wherein both leads are exposed at the bottom surface of the package.

In the solid electrolytic capacitor having such a structure, the anode lead terminal and the cathode lead terminal do not project from the package. Therefore, as compared with a surface-mounting capacitor which has an anode lead terminal and a cathode lead terminal projecting from opposite sides of the package and bent toward the bottom surface of the package, the capacitor having the above-described structure is smaller in height and length and is therefore advantageous for size and weight reduction. However, the capacitor has the following problems.

For making such a capacitor, a capacitor element is mounted to an anode lead terminal and a cathode lead terminal arranged in the same plane so that the anode wire of the capacitor element projects toward the anode lead terminal, whereas a side surface of the capacitor element comes into close contact with the upper surface of the cathode lead terminal. Then, after the anode wire of the capacitor element is fixed to the anode lead terminal, whereas a cathode film of the capacitor element is fixed to the cathode lead terminal, the entirety is sealed in a synthetic resin package.

In mounting the capacitor element to the anode lead terminal and the cathode lead terminal arranged in the same plane, the capacitor element need be positioned at the center widthwise of the two lead terminals for decreasing the width of the solid electrolytic capacitor as a product.

Conventionally, the widthwise positioning is performed by an automatic feeding device for automatically feeding capacitor elements relative to the lead terminals. Therefore, for enhancing the positioning accuracy, it is inevitable to make the automatic feeding device more complicated, which leads to an increase in cost. Further, for enhancing the positioning accuracy, the feeding speed of the capacitor elements and hence the manufacturing speed cannot be increased. Conversely, if the manufacturing speed is increased, the accuracy of the widthwise positioning is deteriorated, making the resulting product large in width.

Moreover, when the capacitor element is mounted to the anode lead terminal and the cathode lead terminal arranged in the same plane so that one side of the capacitor element comes into close contact with the upper surface of the cathode lead terminal, the anode wire of the capacitor element is spaced above the anode lead terminal, forming a gap between the anode wire and the anode lead terminal.

Conventionally, to bridge the gap and electrically connect the anode wire to the anode lead terminal, the anode lead terminal or the anode wire is fixed, in advance, to a bolster made of a metal by welding for example, and the bolster is fixed to the anode wire or the anode lead terminal by welding for example. However, such an arrangement greatly increases the manufacturing cost.

DISCLOSURE OF THE INVENTION

It is, therefore, an object of the present invention to provide a structure of a solid electrolytic capacitor which is free from these problems and to provide a method of making such a capacitor.

A solid electrolytic capacitor according to the present invention comprises a capacitor element having an end surface provided with an anode wire projecting therefrom, a package formed of synthetic resin for entirely sealing the capacitor element, an anode lead terminal electrically connected to the anode wire of the capacitor element, and a cathode lead terminal kept in close contact with a side surface of the capacitor element, the package having a bottom surface at which the anode lead terminal and the cathode lead terminal are exposed. The anode lead terminal has an end portion directed toward the capacitor element and formed with an upwardly bent piece, the upwardly bent piece being formed with a positioning groove for receiving the anode wire.

Further, a method of making a surface-mounting solid electrolytic capacitor according to the present invention comprises the steps of preparing a lead frame formed with plural sets of anode lead terminals and cathode lead terminals each for constituting a solid electrolytic capacitor, upwardly bending a tip end of each anode lead terminal while forming a positioning groove at the tip end, mounting a capacitor element to each set of the anode lead terminal and the cathode lead terminal of the lead frame so that the anode wire of the capacitor element is fitted in the positioning groove of the anode lead terminal, whereas a side surface of the capacitor element comes into close contact with the cathode lead terminal, and forming an overall sealing package of synthetic resin followed by cutting into a plurality of solid electrolytic capacitors.

As described above, the end portion of the anode lead terminal directed toward the capacitor element is bent upward to provide a bent piece formed with a positioning groove and the anode wire of the capacitor element is fitted in the positioning groove. With this structure, when the capacitor element is mounted to the anode lead terminal and the cathode lead terminal, the upwardly bent piece completely bridges a conventionally formed gap between the anode wire and the anode lead terminal. Further, the capacitor element can accurately be positioned at the center widthwise of the anode lead terminal and the cathode lead terminal.

Therefore, according to the present invention, due to the accurate widthwise positioning, the resulting solid electrolytic capacitor as a product can be reduced in width, which leads to size and weight reduction of the product. Further, since the conventionally used metal bolster need not be provided, the manufacturing process is simple and can be performed at a high speed, which leads to a large decrease of the manufacturing cost.

Moreover, the provision of the fitting portion for the capacitor element in the cathode lead terminal at the portion for contacting the side surface of the capacitor element not only enhances the accuracy of the widthwise positioning of the capacitor element relative to the two lead terminals but also contributes to the reliable positioning of the capacitor element in parallel to the two lead terminals. This further promotes the above-described advantages while also enhancing the reliability of electrical connection between the capacitor element and the cathode lead terminal.

The above-described advantages are further promoted when the positioning groove in the upwardly bent piece of the anode lead terminal is V-shaped or U-shaped, because the anode wire can be easily fitted in the positioning groove of such a configuration.

Other objects, features and advantages of the present invention will become clearer from the description of the embodiment given below with reference to the accompanying drawings.

BRIEF DESCRIPTION OF THE DRAWINGS

FIG. 1 is an exploded perspective view illustrating a solid electrolytic capacitor according to an embodiment of the present invention.

FIG. 2 is a sectional view taken along lines II—II in FIG. 1.

FIG. 3 is a perspective view illustrating the solid electrolytic capacitor according to the embodiment of the present invention.

FIG. 4 is a sectional view taken along lines IV—IV in FIG. 3.

FIG. 5 is a perspective view illustrating a modified anode lead terminal.

FIG. 6 is a perspective view illustrating another modified anode lead terminal.

FIG. 7 is a perspective view illustrating a modified cathode lead terminal.

FIG. 8 illustrates a lead frame used for making a solid electrolytic capacitor.

FIG. 9 illustrates the same lead frame on which capacitor elements are mounted.

FIG. 10 illustrates a synthetic resin plate formed on the lead frame for sealing the capacitor elements.

FIG. 11 is a sectional view taken along lines XI—XI in FIG. 10.

DETAILED DESCRIPTION OF THE PREFERRED EMBODIMENTS

Embodiments of the present invention will be described below with reference to the accompanying drawings.

FIGS. 1–4 illustrate a solid electrolytic capacitor according to the present invention.

In the figures, indicated by the reference sign 1 is a capacitor element, which includes an end surface provided with an anode wire 1a projecting therefrom and side surfaces formed with a cathode film 1b.

Indicated by reference signs 2 and 3 are an anode lead terminal and a cathode lead terminal, respectively. The end portion of the anode lead terminal 2 on the side of the cathode Lead terminal 3 is upwardly bent to provide a bent piece 2a which is formed with a positioning groove 2b for receiving the anode wire 1a of the capacitor element 1. The cathode lead terminal 3 has an upper surface which is partially recessed to provide a fitting portion 3a for fitting the capacitor element 1.

The capacitor element 1 is mounted to the anode lead terminal 2 and the cathode lead terminal 3 so that the anode wire 1a of the capacitor element 1 is fitted in the positioning groove 2b of the anode lead terminal 2, whereas one of the side surfaces of the capacitor element 1 is fitted in the fitting portion 3a at the upper surface of the cathode lead terminal 3.

Subsequently, the anode wire 1a of the capacitor element 1 is fixed to the bent piece 2a of the anode lead terminal 2 by deforming one or both of the anode wire 1a and the bent piece 2a or by welding. Alternatively, a conductive paste may be applied to the portion where the anode wire 1a is fitted in the positioning groove 2b, and the paste is then dried to electrically connect these components to each other. Similarly, the cathode film 1b of the capacitor element 1 is electrically connected to the cathode lead terminal 3 by applying and drying a conductive paste.

Then, these components are entirely sealed in a package 4 formed of a heat-resistant synthetic resin such as epoxy resin so that the anode lead terminal 2 and the cathode lead terminal 3 are exposed at the bottom surface of the package 4, thereby providing a completed solid electrolytic capacitor.

As described above, the end portion of the anode lead terminal 2 directed toward the capacitor element 1 is bent upward to provide a bent piece 2a formed with a positioning groove 2b, and the anode wire 1a of the capacitor element 1 is fitted in the positioning groove 2a. Therefore, when the capacitor element 1 is mounted to the anode lead terminal 2 and the cathode lead terminal 3, the upwardly bent piece 2a completely bridges a conventionally-formed gap between the anode wire 1a and the anode lead terminal 2. Further, with such a structure, the capacitor element 1 can be positioned reliably and accurately at the center widthwise of the anode lead terminal 2 and the cathode lead terminal 3.

Moreover, fitting of the capacitor element 1 into the fitting portion 3a provided at the upper surface of the cathode lead terminal 3 makes it possible to reliably position the capacitor element 1 in parallel to both of the lead terminals 2 and 3 while ensuring the reliable electrical connection of the capacitor element 1 to the cathode lead terminal 3.

Such fitting of the anode wire 1a into the positioning groove 2b of the upwardly bent piece 2a of the anode lead terminal 2 can be performed easily when the positioning groove is an upwardly-open V-shaped groove 2b' as shown in FIG. 5 or an upwardly-open U-shaped groove 2b" as shown in FIG. 6.

The fitting portion 3a of the cathode lead terminal 3 may not necessarily comprise a recess formed on the upper surface of the anode lead terminal 3. Alternatively, as shown in FIG. 7, a fitting portion 3a' maybe formed by upwardly bending opposite sides of the cathode lead terminal 3.

Next, referring to FIGS. 8–11, description will be made as to the case where a plurality of solid electrolytic capacitors each having the above-described structure are made by utilizing a lead frame formed of a metal plate.

First, as shown in FIG. 8, a lead frame 10 made of a thin metal plate is prepared, and plural sets of anode lead terminals 2 and cathode lead terminals 3 for making a solid electrolytic capacitor are formed by punching the lead frame 10.

Subsequently, the end portion of each anode lead terminal 2 is bent upward to provide a bent piece 2a formed with a positioning groove 2b. On the other hand, at the end of each cathode lead terminal 3, a fitting portion 3a as a recess is formed by etching or the like or a groove-like fitting portion 3a' as shown in FIG. 7 is formed by bending opposite edges of the cathode lead terminal 3 toward the obverse surface side.

The upward bending to provide the bent piece 2a formed with the positioning groove 2b and the forming of the fitting portion 3a' as shown in FIG. 7 may be performed at the time of punching the lead frame 10.

Subsequently, as shown in FIG. 9, a capacitor element 1 is mounted to each set of the anode lead terminal 2 and the cathode lead terminal 3 of the lead frame 10 so that the capacitor element 1 is fitted in the fitting portion 3a or 3a' of the cathode lead terminal 3, whereas the anode wire 1a of the capacitor element is fitted in the positioning groove 2b of the anode lead terminal 2, and electrical connection is provided as described before.

Then, with an enclosure (not shown) for surrounding these disposed on the lead frame, a heat-resistant synthetic resin such as epoxy resin in liquid state is applied or poured by printing for example into the enclosure to to a height of completely covering the capacitor elements, followed by solidifying the resin. As a result, as shown in FIGS. 10 and 11, a synthetic resin plate 11 is formed which entirely seals the capacitor elements 1.

Subsequently, the lead frame 10 and the synthetic resin plate 11 are cut with a thin dicing cutter along vertical cutting lines 12a, 12b, 12c 12d and horizontal cutting lines 13, thereby providing a plurality of solid electrolytic capacitors.

In cutting along the vertical cutting lines 12a, 12b, 12c, 12d, it is preferable to entirely cut away the portion between the two cutting lines 12b and 12c which has a width W by using a wide dicing cutter, for cost reduction. In this case, the width W of the removed portion is preferably made as small as possible.

With this method, a plurality of solid electrolytic capacitors having the structure as shown in FIGS. 1–4 can be simultaneously formed by utilizing a single lead frame 10.

What is claimed is:

1. A structure of a surface-mounting solid electrolytic capacitor comprising a capacitor element having an end surface provided with an anode wire projecting therefrom, a package formed of synthetic resin for entirely sealing the capacitor element, an anode lead terminal electrically connected to the anode wire of the capacitor element, and a cathode lead terminal kept in close contact with a side surface of the capacitor element, the package having a bottom surface at which the anode lead terminal and the cathode lead terminal are exposed;

the anode lead terminal having an end portion directed toward the capacitor element and formed with an upwardly bent piece, the upwardly bent piece being formed with a positioning groove for receiving the anode wire.

2. The structure of a surface-mounting solid electrolytic capacitor according to claim 1, wherein the positioning groove of the upwardly bent piece of the anode lead terminal is V-shaped or U-shaped.

3. The structure of a surface-mounting solid electrolytic capacitor according to claim 1, wherein the cathode lead terminal is formed, at a portion for close contact with the side surface of the capacitor element, with a fitting portion for fitting the capacitor element.

4. The structure of a surface-mounting solid electrolytic capacitor according to claim 3, wherein the fitting portion comprises a recess.

5. The structure of a surface-mounting solid electrolytic capacitor according to claim 3, wherein the fitting portion comprises a groove formed by bending opposite sides of the cathode lead terminal toward an obverse surface side.

6. A method of making a surface-mounting solid electrolytic capacitor comprising the steps of:

preparing a lead frame formed with plural sets of anode lead terminals and cathode lead terminals each for constituting a solid electrolytic capacitor;

upwardly bending a tip end of each anode lead terminal while forming a positioning groove at the tip end;

mounting a capacitor element to each set of the anode lead terminal and the cathode lead terminal of the lead frame so that the anode wire of the capacitor element is fitted in the positioning groove of the anode lead terminal, whereas a side surface of the capacitor element comes into close contact with the cathode lead terminal; and forming an overall sealing package of synthetic resin followed by cutting into a plurality of solid electrolytic capacitors.

7. A method of making a surface-mounting solid electrolytic capacitor comprising the steps of:

preparing a lead frame formed with plural sets of anode lead terminals and cathode lead terminals for constituting a solid electrolytic capacitor;

upwardly bending a tip end of each anode lead terminal while forming a positioning groove at the tip end;

forming a fitting portion in each cathode lead terminal;

mounting a capacitor element to each set of the anode lead terminal and the cathode lead terminal of the lead frame so that the anode wire of the capacitor element is fitted in the positioning groove of the anode lead terminal, whereas a side surface of the capacitor element comes into close contact with the cathode lead terminal; and forming an overall sealing package of synthetic resin followed by cutting into a plurality of solid electrolytic capacitors.

* * * * *